(12) United States Patent
Rantanen

(10) Patent No.: US 6,674,847 B2
(45) Date of Patent: Jan. 6, 2004

(54) METHOD AND APPARATUS FOR PERFORMING A TRAFFIC MEASUREMENT IN A TELECOMMUNICATION NETWORK

(75) Inventor: Markku Rantanen, Äänekoski (FI)

(73) Assignee: Nôkia Corporation, Espoo (FI)

( * ) Notice: Subject to any disclaimer, the term of this patent is extended or adjusted under 35 U.S.C. 154(b) by 132 days.

(21) Appl. No.: 09/757,873

(22) Filed: Jan. 9, 2001

(65) Prior Publication Data

US 2001/0005413 A1 Jun. 28, 2001

Related U.S. Application Data

(63) Continuation of application No. PCT/EP98/04589, filed on Jul. 22, 1998.

(51) Int. Cl.$^7$ ............................................. H04M 15/00
(52) U.S. Cl. ....................... 379/134; 379/133; 379/139
(58) Field of Search ........................... 379/111, 112.01, 379/112.04, 133, 134, 139, 279; 455/450; 370/230, 232

(56) References Cited

U.S. PATENT DOCUMENTS

| | | | |
|---|---|---|---|
| 4,156,109 A | * 5/1979 | Kraushaar et al. | 379/137 |
| 4,200,771 A | * 4/1980 | Kraushaar et al. | 379/138 |
| 4,679,187 A |   7/1987 | Irvin | |
| 5,042,064 A | * 8/1991 | Chung et al. | 379/112.04 |
| 5,488,715 A | * 1/1996 | Wainwright | 714/4 |
| 5,881,137 A | * 3/1999 | Ginzboorg et al. | 379/112.04 |
| 5,949,862 A | * 9/1999 | Fukuzawa et al. | 379/112.01 |
| 5,978,358 A | * 11/1999 | Wang et al. | 370/234 |
| 6,011,838 A | * 1/2000 | Cox | 379/112.06 |
| 6,430,278 B1 | * 8/2002 | Suzuki | 379/133 |
| 6,449,350 B1 | * 9/2002 | Cox | 379/134 |

FOREIGN PATENT DOCUMENTS

| EP | 0 464 283 | 1/1992 |
|---|---|---|
| JP | 60165160 | 8/1985 |

* cited by examiner

*Primary Examiner*—Curtis Kuntz
*Assistant Examiner*—Barry W Taylor
(74) *Attorney, Agent, or Firm*—Squire, Sanders & Dempsey L.L.P.

(57) ABSTRACT

A method and apparatus for performing a traffic measurement in a telecommunication network is disclosed, wherein a real-time traffic intensity measurement is based on a total reservation time calculation of an object, each time the traffic state of the object is changed. The object can be any circuit of a circuit group and the state change can be a circuit reservation or release. Since the total reservation time is calculated at any state change of the object, state changes are considered regardless of the actual reporting time. Thus, exact and real-time traffic intensity values can be obtained.

8 Claims, 2 Drawing Sheets

METHOD AND APPARATUS FOR PERFORMING A TRAFFIC MEASUREMENT IN A TELECOMMUNICATION NETWORK

This is continuation of Application No. PCT/EP98/04589, filed Jul. 22, 1998.

FIELD OF THE INVENTION

The present invention relates to a method and apparatus for performing a traffic measurement in a telecommunication network, like a public switched telephone network (PSTN) or a public land mobile network (PLMN).

BACKGROUND OF THE INVENTION

An understanding of the nature of the telephone traffic and its distribution with respect to time and destination is essential in determining the amount of telephone facilities required to serve the subscribers' needs.

The telephone traffic is defined as the aggregate of telephone calls over a group of circuits or trunks with regard to their durations of the calls as well as there numbers. Traffic flow through a switch or trunk group is defined as the product of the number of calls during a period of time and their average holding times. In traffic theory, the unit of time is one hour. Let C be the number of calls originated in one hour, and T be the average holding time, then the traffic flow intensity A is calculated on the basis of the following equation:

$$A = C \times T$$

For example, if there are 200 calls of average length of 3 minutes between Atlanta and Los Angeles in one hour, then the traffic intensity is:

$$A = 200 \times 3 = 600 \text{ minute-calls}$$

Expressed in hours, A=600/60=10. This value is dimensionless but a name was given to it. The international unit of telephone traffic is called "erlang", named after the Danish mathematician A. K. Erlang, founder of the theory of telephone traffic.

From the example above, A=10 erlangs. This number represents:

1. The average number of calls in progress simultaneously during the period of one hour, or
2. The average number of calls originated during a period of time equal to the average call holding time, or
3. The total time, expressed in hours, to carry all calls.

In the US, the term Unit Call (UC) or its synonym "Centium Call-Second", abbreviated CCS is generally used.

To estimate traffic intensity, mechanical devices were invented to sample or observe the number of busy circuits. These devices can sample each trunk group once every 100 seconds (or 36 times per hour). If the measuring device found that in one hour, all 36 samples show that a particular trunk is being used, it is concluded that the trunk is being used the whole hour, thus by definition this trunk carries 1 erlang or 36 CCS (i.e. 1 erlang=36 CCS).

In the above example, if the average holding time is 5 minutes instead of 3 minutes, then the traffic intensity is:

$$A = (200 \times 5)/60 = 16.67 \text{ erlangs}$$

According to the above first definition, the average number of busy trunks between Atlanta and Los Angeles has just increased to 16.67 from 10, because the average subscriber holds a conversation 2 minutes longer In a known traffic measurement performed for example in a fixed exchange switch of a PLMN, a sampling method is used. According to this method, traffic samples are taken continuously. The traffic intensity corresponds to the average value of these samples.

FIG. 2 shows a time diagram used for explaining the known traffic measurement.

It is assumed that the measurement starts at 12:15:00, wherein a result accumulation period is 15 minutes. The samples are shown and numbered in FIG. 2. In this connection, it is to be noted that sampling is running although measurement has not yet started.

The measurement is performed on the basis of counters for counting predetermined parameters used for calculating the resultant traffic. In the present case, counters are used for a current sample amount sa, an previous sample amount sap, an instantaneous load ld, a cumulative load lc and a previous cumulative load lcp.

At 12:15:00, the measurement starts and the counters are initialized. As call 1 is running, the instantaneous load amounts to ld=1. Since, according to FIG. 2, the measurement starts after 29 samples, the counters are initialized to a previous sample amount sap=29, a sample amount sa=29, a cumulative load lc=0 and a previous cumulative load lcp=0.

After the sample number 30, the counter are updated to ld=1, sap=29, and sa=30. The cumulative load lc is calculated on the basis of the equation lc=lc+ld=0+1=1.

At sample number 31, ld=1, sap=29, sa=31, lc=lc+ld=1+1=2.

Since call 2 starts at the time 12:18:00, the instantaneous load ld is increased to 2. Accordingly, at the sample number 32, ld=2, sap=29, sa=32, lc=lc+ld=2+2=4.

At sample number 33, ld=2, sap=29, sa=33, lc=lc+ld=4+2=6.

Since call 3 starts at the time 12:22:00, the instantaneous load ld is increased to ld=3.

Accordingly, at the sample 34, ld=3, sap=29, sa=34, lc=lc+ld=6+3=9.

At the sample number 35, ld=3, sap=29, sa=35, lc=lc+ld=9+3=12.

Since the call 3 is released at the time 12:27:00, the instantaneous load ld is decreased to ld=2.

Accordingly, at the sample number 36, ld=2, sap=29, sa=36, lc=lc+ld=12+2=14.

At the sample number 37, ld=2, sap=29, sa=37, lc=lc+ld=14+2=16.

At the time 12:30:00, 15 minutes after the start of the measurement, the first reporting is performed and the traffic intensity is calculated according to the following equation:

$$tr = (lc - lcp)/(sa - sap) = (16-0)/(37-29) = 16/8 = 2$$

wherein tr denotes the calculated traffic in erlang.

After the above calculation, the previous sample amount is set to sap=37 and the previous cumulative load to lcp=16. In this respect, it is to be noted that the correct traffic value is 2.133 erlang. Thus, the calculation error is −6.7%.

Until the second reporting at 12:45:00, the updating of the above counters is performed in the same manner as described above.

After the sample number 45, the following values are obtained: lc=30, lcp=16, sa=45 and sap=37.

Thus, the traffic intensity value amounts to tr=(30−16)/(45−37)=14/8=1.75 erlang. In the present case, the correct value is 1.667 erlang, such that the error amounts to +4.9%.

Thereafter, the previous sample amount is set to sap=45 and the previous cumulative load to lcp=30.

When the third report is issued at 13:00:00, the following values are obtained from the counters: lc=35, lcp=30, sa=50 and sap=45.

Thus, the traffic intensity value amounts to tr=(35−30)/(50−45)=5/5=1 erlang. In this case, the correct value of the traffic intensity is 1 erlang, such that the error is 0%.

Thereafter, the previous sample amount is set to sap=50 and the previous cumulative load to lco=35.

When the fourth report is issued at 13:15:00, the following counter values are obtained: lc=40, lcp=35, sa=57 and sap=50.

Accordingly, the traffic intensity value amounts to tr=(40−35)/(57−50)=5/7=0.714 erlang. In this case, the correct traffic value is 0.667 erlang, such that the error is −7.0%.

Thereafter, the previous sample amount is set to sap=57 and the previous cumulative load to lcp=40.

Accordingly, with this method of performing traffic measurement, the accuracy of the measurement as well as the load of a CPU performing the traffic calculation is obviously dependent on the sampling period. If the sampling period is short, accuracy and CPU load are both increased. However, if the sampling period is long, the accuracy will decrease so that short calls between samples will not be registered at all. In practice, a default sampling period is set to 36 seconds.

Another known method of performing traffic measurement is a time-based method used for example in a mobile exchange MSC (Mobile Switching Center) of a PLMN. This method is based on an object reservation time. A start time and a stop time of every call is stored. From these times, the total reservation time can be calculated. The traffic value or intensity is calculated by dividing the total reservation time by the accumulation period.

In the following, the time-based traffic measurement is explained on the basis of the call distribution shown in FIG. 2, wherein the measurement starts at 12:15:00 and the result accumulation period is 15 minutes.

At 12:13:00, the call 1 starts and the start time is registered.

At 12:15:00, the measurement starts and a previous report time is set to trp=12:15:00.

The call 2 starts at 12:18:00, such that the start time of call 2 is set to 12:18:00. Moreover, call 3 starts at 12:22:00 and a corresponding start time is registered for call 3.

At 12:27:00, the call 3 is released and a corresponding stop time of call 3 is registered. Moreover, since the call 3 has been released, a corresponding total reservation time or cumulative time tc is determined according to the equation:

$$tc=tc+(\text{call 3 stop time}-\text{call 3 start time})=0+(12:27:00-12:22:00)=0+5\ min=300s.$$

At 12:30:00, the first reporting and traffic intensity measurement is performed according to the following equation:

$$tr=(tc-tcp)/(trc-trp),$$

wherein tc indicates the current cumulative time, tcp the previous cumulative time, trp the previous report time and trc the current report time.

Thus, in the present case the traffic intensity value amounts to tr=(300 s−0 s)/(12:30:00−12:15:00)=300 s/900 s=0.333 erlang. It is to be noted that the error is −640% (correct traffic value is 2.133 erlang), since only call 3 has been released in this measurement period.

Thereafter, the previous report time is set to trp=12:30:00 and the previous cumulative time to tcp=300 s.

At 12:40:00, call 1 is released and the corresponding stop time is registered.

Thus, the cumulative time amounts tc=tco−(call 1 stop time−call 1 start time)=300 s+(12:40:00−12:13:00)=300 s+1620 s=1920 s.

In the second reporting at 12:45:00, the traffic intensity value amounts to tr=(1920 s−300 s)/(12:45:00−12:30:00)=1620 s/900 s=1.8 erlang. Thus, the error amounts to +7.9% (correct value is 1.667 erlang).

Thereafter, the previous report time is set to trp=12:45:00 and the previous cumulative time to tcp=1920 s.

The third reporting at 13:00:00 leads to a traffic intensity value tr=(1920 s−1920 s)/(13:00:00−12:45:00)=0 s/900 s=0 erlang. Thus, the error is huge, since no calls were released in this measurement period at all.

Thereafter, the previous report time is set to trp=13:00:00 and the previous cumulative time to tcp=1920 s.

At 12:40:00, call 2 is released, the corresponding stop time is registered and the counter for the cumulative time is updated, such that tc=1920 s+(12:40:00−12:18:00)=1920 s+1320 s=3240 s.

The fourth reporting at 13:15:00 leads to a traffic intensity value of tr=(3240 s−1920 s)/(13:15:00−13:00:00)=1320 s/900 s=1.467 erlang. In this case, the error amounts to +220%, since the correct traffic value is 0.667 erlang.

Thereafter, the previous report time is set to trp=13:15:00 and the previous cumulative time to tcp=3240 s.

As can be gathered from the above example, this known time-based method leads to the disadvantage that the calls are not registered until they are released. Moreover, calls are reserved before the measurement start will effect the traffic values.

Accordingly, both known methods and apparatuses for performing traffic measurement provide low accuracies and are not suitable for obtaining real-time traffic values.

Document JP-A-60 165160 discloses a method and apparatus for performing a traffic measurement as defined in the preambles of claims 10 and 14, respectively. In particular, a retention time measurement is performed at an exchange, wherein an operation start time and a release time of an individual telephone set is counted so as to calculate the retention time of the telephone set.

SUMMARY OF THE INVENTION

It is an object of the present invention to provide a method and apparatus for performing a traffic measurement, which provide exact and real-time traffic values.

This object is achieved by a method for performing a traffic measurement in a telecommunication network, comprising the steps of:

determining a cumulative total reservation time of a measurement object each time a traffic state of the object changes, and calculating a traffic value by dividing a change of the determined cumulative total reservation time by a corresponding time period.

Furthermore, the above object is achieved by an apparatus for performing a traffic measurement in a telecommunication network, comprising:

means for determining a cumulative total reservation time of an object to be measured, control means for controlling the determining means so as to update the cumulative total reservation time each time a traffic state of the object changes, and calculating means for calculating a traffic value by dividing a change of the cumulative total reservation time by a corresponding time period.

Accordingly, since the cumulative total reservation time is determined each time a traffic state of the object changes, updating of the counters for calculating the traffic value can be done at any time regardless whether the traffic state of the object has changed or not. Thus, a correct cumulative total reservation time is always available such that exact and real-time traffic values can be obtained at any time of reporting.

Preferably, the calculation of the traffic value is performed when a traffic report is issued, wherein the corresponding time period is a time period since the last traffic report.

The total reservation time may be determined by multiplying a value of an instantaneous load by a time period since the last determination of the cumulative total reservation time, wherein the value of the instantaneous load is updated each time the traffic state of the object changes.

The traffic state change of the object may correspond to a call reservation or a call release.

Preferably, said object to be measured is an exchange switch.

Furthermore, the determining means may comprise a counting means for counting the instantaneous load, a previous updating time, a current time, the cumulative total reservation time, a previous cumulative total reservation time and a last report time, wherein the calculation means is arranged to read the counting means and to calculate the change of the cumulative total reservation time by subtracting a read value of the previous cumulative total reservation time from a read value of the cumulative total reservation time, and the corresponding time period by subtracting a read value of the last report time from a read value of the current time.

Preferably, the determining means determines the cumulative total reservation time by reading the counting means and by multiplying a read value of the instantaneous load by a difference between a read value of the current time and a read value of the previous updating time.

The counting means may be updated, when a traffic report is requested.

Furthermore, a clock system may be provided for supplying a clock and for notifying the counting means of a clock change.

Further preferred developments of the present invention are defined in the dependent claims.

BRIEF DESCRIPTION OF THE DRAWINGS

In the following, the invention will be described in greater detail on the basis of a preferred embodiment with respect to the accompanying drawings, wherein.

DESCRIPTION OF THE PREFERRED EMBODIMENT

Figure 1:
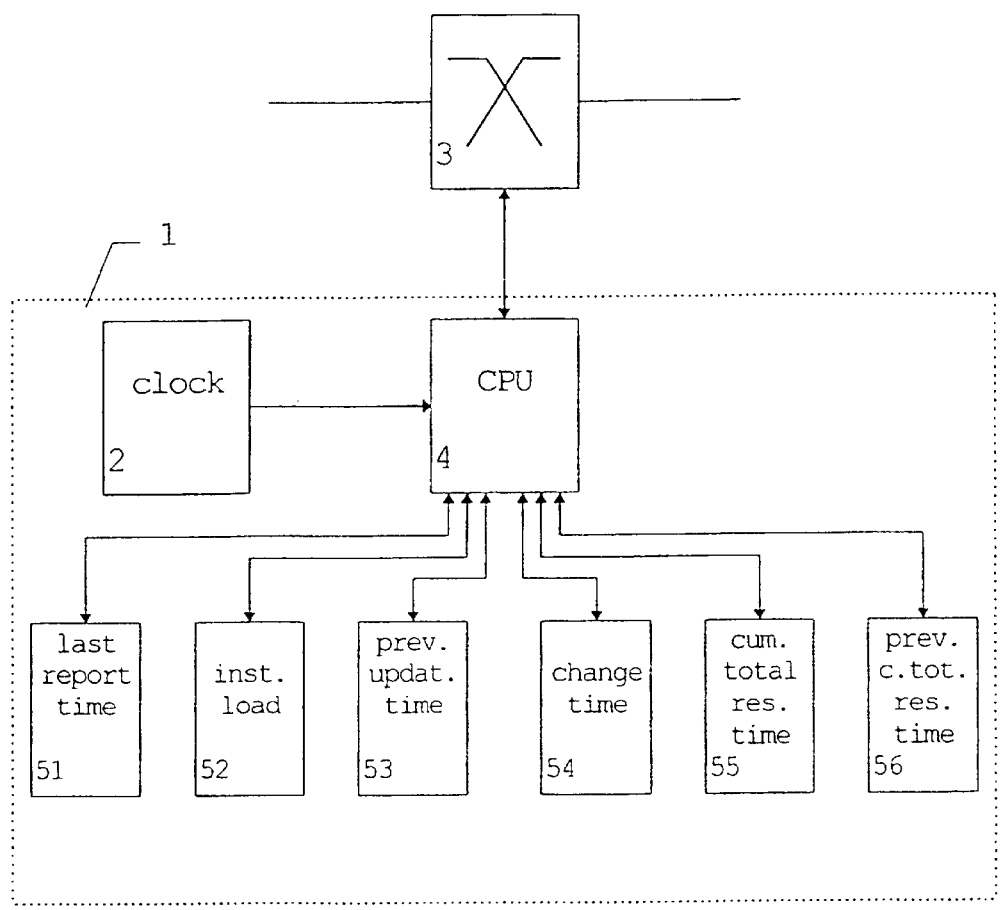
FIG. 1 shows a block diagram of an apparatus for performing a traffic measurement according to a preferred embodiment of the present invention.

A preferred embodiment of the present invention is shown in FIG. 1, wherein an exchange switch 3 of a telecommunication switching network is connected to a central processing unit (CPU) 4 of a means 1 for measuring a value of the traffic switched by the exchange switch 3. The measurement or calculation of the traffic value is performed on the basis of parameter values obtained from counting means 51–56 controlled or updated by the CPU 4.

The counting means 51–56 are increased by the CPU 4 each time a change of the traffic switched by the exchange switch 3 occurs. Such a change is, for example, a release of a switched call or a reservation of a new call.

Based on predetermined parameter values obtained from the counting means 51–56, the CPU 4 calculates a traffic intensity value on the basis of a control program at predetermined result accumulation periods and reports the obtained result to an operator of the exchange switch 3 or stores the result in a corresponding file or data base.

The counting means comprises a plurality of counters 51–56 used for updating predetermined parameter values required for calculating the value of the traffic intensity or load. As an alternative, registers could be used instead of the counters, wherein the predetermined parameter values are calculated as such by the CPU 4 and stored in the corresponding register.

In particular, the counting means 51–56 comprises a counter 51 used for updating a last report time which is the time of calculation and reporting of the last traffic intensity value.

Moreover, a counter 52 is provided for updating an instantaneous load which defines the current number of calls switched by the exchange switch 3.

Additionally, a counter 53 is provided for updating a previous updating time which is a time where the last update of the traffic load of the exchange switch 3 has occurred, i.e. due to a call reservation or a call release. Moreover, a counter 54 for updating a current time is provided, wherein the current time is used to indicate a time of a current traffic state change of the exchange switch 3.

Finally, counters 55 and 56 are provided for updating a total reservation time and a previous total reservation time, respectively, wherein the total reservation time indicates a value obtained by accumulating reservation times whenever a traffic report or a traffic change at the exchange switch 3 occurs. The reservation time is determined by multiplying the current instantaneous load by a time period since the last updating of the counters, i.e. since the last traffic report or traffic change of the exchange switch 3. The previous cumulative total reservation time corresponds to the cumulative total reservation time obtained before the last update.

Since the counters 52–56 are updated each time a traffic change or a traffic report occurs, the cumulative total reservation time always correctly reflects the traffic history of the exchange switch 3, regardless of the result accumulation period or reporting period.

Thus, a real-time traffic measurement is performed based on a total reservation time calculation of the exchange switch 3, each time the traffic state is changed.

Instead of the exchange switch 3 any circuit of a circuit group could be measured, wherein a state change could be a circuit reserving or releasing.

If there is more than one process of counting the traffic value of intensity using the same counters 51–56, each process requires an own counter 51 for counting the last report time. The remaining counters 52–56 can than be used in common.

Additionally, a clock system 2 can be provided for supplying a clock to the CPU 4, wherein an exchange clock back forwarding or forwarding, e.g. summer time setting, must be handled. The clock system 2 must notify the CPU 4 or the time counters 53-30 56, so that the right past time can be calculated. Otherwise the traffic values would be wrong.

Furthermore, a run over or overflow of the counters 51–56 must be handled. This can be achieved by detecting, whether a current counter value is less than an old value, which indicates that an overflow has occurred. This can be done by a control program performed by the CPU 4.

Figure 2:
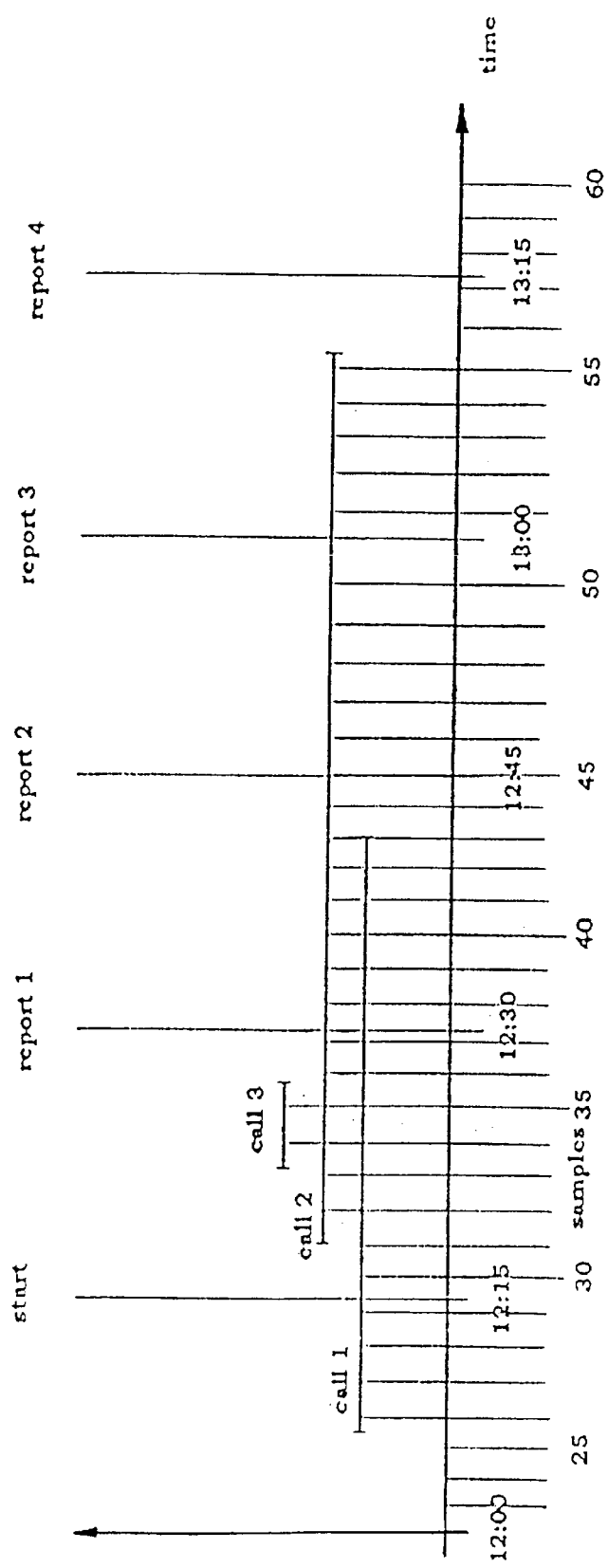
FIG. 2 shows a time diagram used for explaining a method for performing traffic measurement according to the preferred embodiment of the present invention.

In the following, an example for a traffic measurement in the preferred embodiment of the present invention is described by referring to FIG. 2.

It is assumed that measurement starts at 12:15:00 and that the result accumulation period is 15 minutes.

Furthermore, the following equations are used for calculating the cumulative total reservation time and the traffic intensity:

$$tres = tres + ld \times (tcu - tup)$$

$$tr = (tres - tresp)/(tcu - trep),$$

wherein Id indicates the instantaneous load, tcu the current time, tup the previous updating time, tres the cumulative total reservation time, tresp the previous cumulative total reservation time, and trep the last report time.

It is to be noted what the time values, e.g. 12:15:00, of the present example are merely used figuratively and cannot be subtracted directly. Thus, corresponding conversion routines are used by the CPU 4 for obtaining respective time differences.

At the time 12:15:00, the measurement starts and the counters are initialized. Since only call 1 is running according to FIG. 2, the instantaneous load is set to ld=1. After the initialization, the previous updating time amounts to tup=12:15:00, the change time to tcu=12:15:00, the cumulative total reservation time to tres=0, the previous cumulative total reservation time to tresp=0 and the last report time tc trep=12:15:00.

At 12:18:00, the first traffic change occurs, since call 2 is beginning and the counters are updated correspondingly. Thus:

$$tres = 0 + 1 \times (12:18:00 - 12:15:00) = 180\ s$$

$$ld = 2$$

$$tup = 12:18:00$$

The next traffic change occurs at 12:22:00, where call 3 begins, and the counters are again updated as follows:

$$tres = 180s + 2 \times (12:22:00 - 12:18:00) = 180\ s + 480s = 660s$$

$$id = 3$$

$$tup = 12:22:00$$

At 12:27:00, the next traffic change occurs, since call 3 is released, and the counters are again updated as follows:

$$tres = 660s + 3 \times (12:27:00 - 12:22:00) = 660\ s + 900\ s = 1560s$$

$$ld = 2$$

$$tup = 12:27:00.$$

According to the selected result accumulation period of 15 minutes, the first calculation and reporting of the traffic intensity value takes place at 12:30:00. In the present case, the cumulative total reservation time and the corresponding traffic intensity amount to:

$$tres = 1560s + 2 \times (12:30:00 - 12:27:00) = 1560s + 360s = 1920s$$

$$tr = (1920s - 0s)/(12:30:00 - 12:15:00) = 1920s/900s = 2.133\ \text{erlang}.$$

The counters are updated such that trep=12:30:00, tup=12:30:00 and tress=1920 s.

The next change of the traffic state occurs at 12:40:00, since call 1 is released and the counters are updated in the following manner:

$$tres = 1920s + 2 \times (12:40:00 - 12:30:00) = 1920\ s + 1200s = 3120s$$

$$ld = 1$$

$$tup = 12:40:00.$$

No further traffic change takes place until the next reporting time at 12:45:00, wherein the traffic intensity is calculated and the counters are updated as follows:

$$tres = 3120s + 1 \times (12:45:00 - 12:40:00) = 3120\ s + 300s = 3420s$$

$$tr = (3420\ s - 1920\ s)/(12:45:00 - 12:30:00) = 1500s/900s = 1.667\ \text{erlang}$$

$$trep = 12:45:00$$

$$tup = 12:45:00$$

$$tresp = 3420s$$

As no traffic change takes place until the next reporting time at 13:00:00, the next traffic intensity calculation is performed without an intermediate traffic change and the counters are updated as follows:

$$tres = 3420s + 1 \times (13:00:00 - 12:45:00) = 3420\ s + 900s = 4320\ s$$

$$tr = (4320s - 3420\ s)/(13:00:00 - 12:45:00) = 900\ s/900s = 1\ \text{erlang}$$

$$trep = 13:00:00$$

$$tup = 13:00:00$$

$$tresp = 4320\ s.$$

At 13:10:00, call 2 is released and the counters are updated as follows due to the corresponding change of the traffic state:

$$tres = 4320s + 1 \times (13:00:00 - 13:10:00) = 4320s + 600s = 4920s$$

$$id = 0$$

$$tup = 13:10:00.$$

At 13:15:00, the fourth traffic intensity calculation and reporting is performed and the counters are updated as follows:

$$tres = 4920s + 0 \times (13:15:00 - 13:10:00) = 4920s + 0s = 4920\ s$$

$$tr = (4920s - 4320\ s)/(13:15:00 - 13:00:00) = 600\ s/900\ s = 0.667\ \text{erlang}$$

$$trep = 13:15:00$$

$$tup = 13:15:00$$

$$tresp = 4920s.$$

As can be gathered from the above example, the period from the beginning of call 1 to the start time of the measurement has no effect on the first report of the traffic intensity. Since any change of the traffic state is taken into account, the traffic intensity values are exactly right in all reports.

It should be understood that the above description and the accompanying figures are only intended to illustrate the present invention. Thus, the method and apparatus according to the present invention may also be used in network elements other than the described exchange switch 3.

Moreover, the preferred embodiment of the present invention may vary within the scope of the attached claims.

In summary, a method and apparatus for performing a traffic measurement in a telecommunication network is disclosed, wherein a real-time traffic intensity measurement is based on a total reservation time calculation of an object each time the traffic state of the object is changed. The object can be any circuit of a circuit group and the state change can be a circuit reservation or release. Since the total reservation time is calculated at any state change of the object, state changes are considered regardless of the actual reporting time. Thus, exact and real-time traffic intensity values can be obtained.

What is claimed is:

1. A method for performing a traffic measurement in a telecommunication network, comprising:

determining a total reservation time of a measurement object regardless of a traffic load associated with the measurement object, wherein said total reservation time is a cumulative total reservation time determined at each traffic change of said measurement object by multiplying a value of an updated instantaneous load by a time period since the last determination of said cumulative total reservation time; and calculating a traffic intensity by dividing a change of said cumulative total reservation time by a corresponding time period, wherein determining a total reservation time comprises updating values of the instantaneous load, a previous change time, a current time, the cumulative total reservation time, a previous cumulative total reservation time, and a last report time, wherein calculating a traffic intensity comprises reading the counting means and calculating the change of the cumulative total reservation time by subtracting a read value of the previous cumulative total reservation time from a read value of the cumulative total reservation time, and calculating a value of the corresponding time period by subtracting a read value of the last report time from a read value of the current time, and wherein determining the total reservation time determines the cumulative total reservation time by reading the counting means and by multiplying a read value of the instantaneous load by a difference between a read value of the last report time and a read value of the current time.

2. The method according to claim 1, wherein said calculation step is performed when a traffic report is issued, and wherein said corresponding time period is a time period since the last traffic report.

3. The method according to claim 1, wherein the value of said instantaneous load is updated at each traffic change of said measurement object.

4. The method according to claim 1, wherein the traffic change of said object corresponds to a call reservation or a call release.

5. An apparatus for performing a traffic measurement in a telecommunication network, comprising:

means for determining a total reservation time of a measurement object regardless of a traffic load associated with the measurement object, wherein said total reservation time is a cumulative total reservation time determined by multiplying a value of an updated instantaneous load of the measurement object by a time period since the last determination of the total reservation time;

control means for controlling said determining means so as to update the cumulative total reservation time at each traffic change of the measurement object; and calculating means for calculating a traffic intensity by dividing a change of the total reservation time by a corresponding time period, wherein said determining means comprises counting means for updating values of the instantaneous load, a previous change time, a current time, the cumulative total reservation time, a previous cumulative total reservation time, and a last report time, wherein the calculation means is arranged to read the counting means and to calculate the change of the cumulative total reservation time by subtracting a read value of the previous cumulative total reservation time from a read value of the cumulative total reservation time, and a value of the corresponding time period by subtracting a read value of the last report time from a read value of the current time, and wherein the determining means determines the cumulative total reservation time by reading the counting means and by multiplying a read value of the instantaneous load by a difference between a read value of the last report time and a read value of the current time.

6. The apparatus according to claim 5, wherein said object to be measured is an exchange switch.

7. The apparatus according to claim 5, wherein said counting means are updated, when a traffic report is issued.

8. The apparatus according to claim 5, further comprising a clock system for supplying a clock and for notifying the control means of a clock change.

* * * * *